United States Patent
Funabiki et al.

(10) Patent No.: US 10,937,345 B2
(45) Date of Patent: Mar. 2, 2021

(54) VIDEO DISPLAY SYSTEM, VIDEO DISPLAY METHOD, NON-TRANSITORY STORAGE MEDIUM, AND MOVING VEHICLE THAT PROJECTS A VIRTUAL IMAGE ONTO A TARGET SPACE

(71) Applicants: PANASONIC INTELLECTUAL PROPERTY MANAGEMENT CO., LTD., Osaka (JP); HONDA MOTOR CO., LTD., Tokyo (JP)

(72) Inventors: Makoto Funabiki, Osaka (JP); Koji Taniguchi, Fukuoka (JP); Hiroaki Okayama, Nara (JP); Masafumi Higashiyama, Saitama (JP); Yosuke Shibazaki, Saitama (JP)

(73) Assignees: PANASONIC INTELLECTUAL PROPERTY MANAGEMENT CO., LTD., Osaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/447,309

(22) Filed: Jun. 20, 2019

(65) Prior Publication Data
US 2019/0392740 A1   Dec. 26, 2019

(30) Foreign Application Priority Data
Jun. 21, 2018   (JP) ............................. JP2018-117662

(51) Int. Cl.
*G09G 3/00*      (2006.01)
*G02B 27/01*     (2006.01)
*G09G 5/10*      (2006.01)
*B60K 35/00*     (2006.01)

(52) U.S. Cl.
CPC ............. *G09G 3/001* (2013.01); *B60K 35/00* (2013.01); *G02B 27/0179* (2013.01); *G09G 5/10* (2013.01); *B60K 2370/1529* (2019.05); *B60K 2370/167* (2019.05); *B60K 2370/31* (2019.05); *B60K 2370/334* (2019.05); *B60K 2370/52* (2019.05); *G02B 2027/0185* (2013.01);
(Continued)

(58) Field of Classification Search
None
See application file for complete search history.

(56) References Cited

U.S. PATENT DOCUMENTS 9,995,932 B2 *   6/2018   Tai ...................... G02B 27/0101
10,613,325 B2 *   4/2020   Matsuzaki ......... G02B 27/0149
(Continued)

FOREIGN PATENT DOCUMENTS

JP      2015-011211       1/2015

*Primary Examiner* — Jason A Pringle-Parker
(74) *Attorney, Agent, or Firm* — Greenblum & Bernstein, P.L.C.

(57) ABSTRACT

A video display system according to an embodiment includes a display unit, a projection unit, and a display control unit. The display unit displays an image thereon. The projection unit projects a virtual image corresponding to the image onto a target space with outgoing light of the display unit. The display control unit is able to change a projection distance from a viewpoint of a user, who is viewing the virtual image, to the virtual image projected onto the target space. The display control unit changes the projection distance in a change pattern. The change pattern varies according to situation information.

18 Claims, 9 Drawing Sheets

US 10,937,345 B2
Page 2

(52) U.S. Cl.
CPC ........... *G09G 2320/0626* (2013.01); *G09G 2360/144* (2013.01); *G09G 2380/10* (2013.01)

(56) References Cited

U.S. PATENT DOCUMENTS

| | | | | |
|---|---|---|---|---|
| 2004/0219978 | A1* | 11/2004 | Teramoto | A63F 13/10 463/32 |
| 2004/0219980 | A1* | 11/2004 | Bassett | A63F 13/5252 463/33 |
| 2007/0257914 | A1* | 11/2007 | Komatsumoto | G06T 13/20 345/427 |
| 2012/0032874 | A1* | 2/2012 | Mukawa | G02B 27/0172 345/8 |
| 2013/0222228 | A1* | 8/2013 | Walker | H04N 9/3179 345/156 |
| 2014/0268353 | A1* | 9/2014 | Fujimura | G02B 27/01 359/630 |
| 2015/0321606 | A1* | 11/2015 | Vartanian | B60R 1/00 348/148 |
| 2016/0134848 | A1 | 5/2016 | Watanabe et al. | |
| 2016/0140760 | A1* | 5/2016 | Bowden | B60R 1/00 345/633 |
| 2016/0187651 | A1* | 6/2016 | Border | G06F 3/012 345/8 |
| 2016/0266390 | A1* | 9/2016 | Seo | G09G 3/001 |
| 2017/0131550 | A1* | 5/2017 | Oh | G06T 11/60 |
| 2017/0169612 | A1* | 6/2017 | Cashen | G06T 19/20 |
| 2017/0309049 | A1* | 10/2017 | Law | G06T 15/04 |
| 2018/0259637 | A1* | 9/2018 | Zeng | G01S 13/931 |
| 2018/0335634 | A1* | 11/2018 | Oliveira | G02B 27/0179 |
| 2019/0011703 | A1* | 1/2019 | Robaina | A61B 90/37 |
| 2019/0116344 | A1* | 4/2019 | Nguyen | H04N 9/317 |

* cited by examiner

VIDEO DISPLAY SYSTEM, VIDEO DISPLAY METHOD, NON-TRANSITORY STORAGE MEDIUM, AND MOVING VEHICLE THAT PROJECTS A VIRTUAL IMAGE ONTO A TARGET SPACE

CROSS-REFERENCE TO RELATED APPLICATION

This application claims the benefit of foreign priority to Japanese Patent Application No. 2018-117662 filed on Jun. 21, 2018, which is assigned to the assignee of the present application.

TECHNICAL FIELD

The present disclosure generally relates to a video display system, a video display method, a non-transitory storage medium, and a moving vehicle including the video display system, and more particularly relates to a video display system, a video display method, a non-transitory storage medium, and a moving vehicle including the video display system, all of which are configured or designed to project a virtual image onto a target space.

BACKGROUND ART

A head-up display device (HUD) has been known in the art as an exemplary video display system for projecting a virtual image onto a target space. Such a video display system is disclosed, for example, in JP 2015-11211 A (hereinafter referred to as DO. The HUD includes a projector and a second screen (display unit) onto which video is projected from the projector. The video display system has the video projected onto the second screen reflected from a windshield of a vehicle to make an occupant of the vehicle view the reflected video, thus generating a virtual image of the video to be viewed by the occupant of the vehicle.

This HUD shifts the second screen back and forth along an optical path to change the position where a second virtual image is generated as a virtual image of the video projected onto the second screen. In shifting the second screen, the HUD performs the processing of adjusting the distortion and size, varying with the position of the screen, of the video projected onto the second screen. Once the second screen has shifted to a new position, the HUD starts projecting the video subjected to correction corresponding to the new position of the second screen.

The HUD of DI shifts the second screen when changing the position where the second virtual image is generated (i.e., when changing the projection distance of the virtual image), and then makes correction to the video projected onto the second screen after having shifted the second screen. Therefore, while the second screen is being shifted, additional distortion could be generated in the second virtual image, thus possibly making a change in the projection position of the second virtual image noticeable.

SUMMARY

The present disclosure provides a video display system, a video display method, a non-transitory storage medium, and a moving vehicle, all of which are configured or designed to make such a change in the projection distance of the virtual image much less noticeable.

A video display system according to an aspect of the present disclosure includes a display unit, a projection unit, and a display control unit. The display unit displays an image thereon. The projection unit projects a virtual image corresponding to the image onto a target space with outgoing light of the display unit. The display control unit is able to change a projection distance from a viewpoint of a user, who is viewing the virtual image, to the virtual image projected onto the target space. The display control unit changes the projection distance in a change pattern. The change pattern varies according to situation information.

A moving vehicle according to another aspect of the present disclosure includes the video display system described above, and a moving vehicle body in which the video display system is installed.

A video display method according to still another aspect of the present disclosure includes changing, in a change pattern varying according to situation information, a projection distance from a user's viewpoint to a virtual image projected onto a target space with outgoing light of a display unit.

A non-transitory storage medium according to yet another aspect of the present disclosure stores a program that is designed to make a computer system execute the video display method described above.

DESCRIPTION OF EMBODIMENTS

Embodiment (1) Overview

Figure 1:
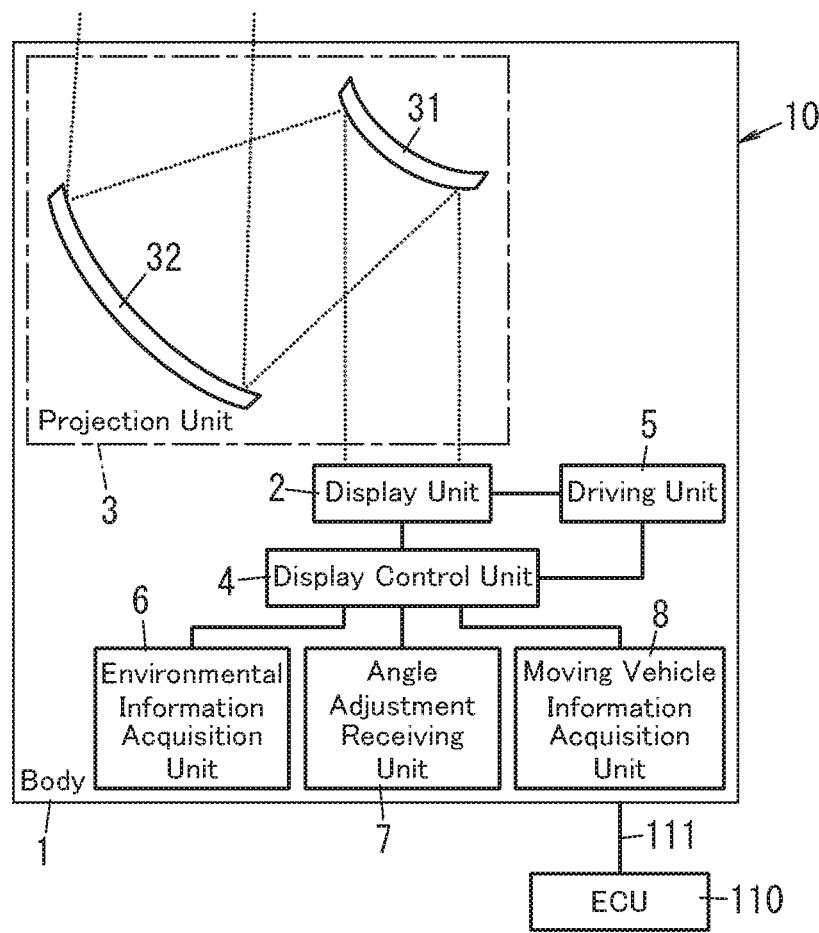
FIG. 1 is a block diagram illustrating a schematic configuration for a video display system according to an exemplary embodiment of the present disclosure.
Figure 2:
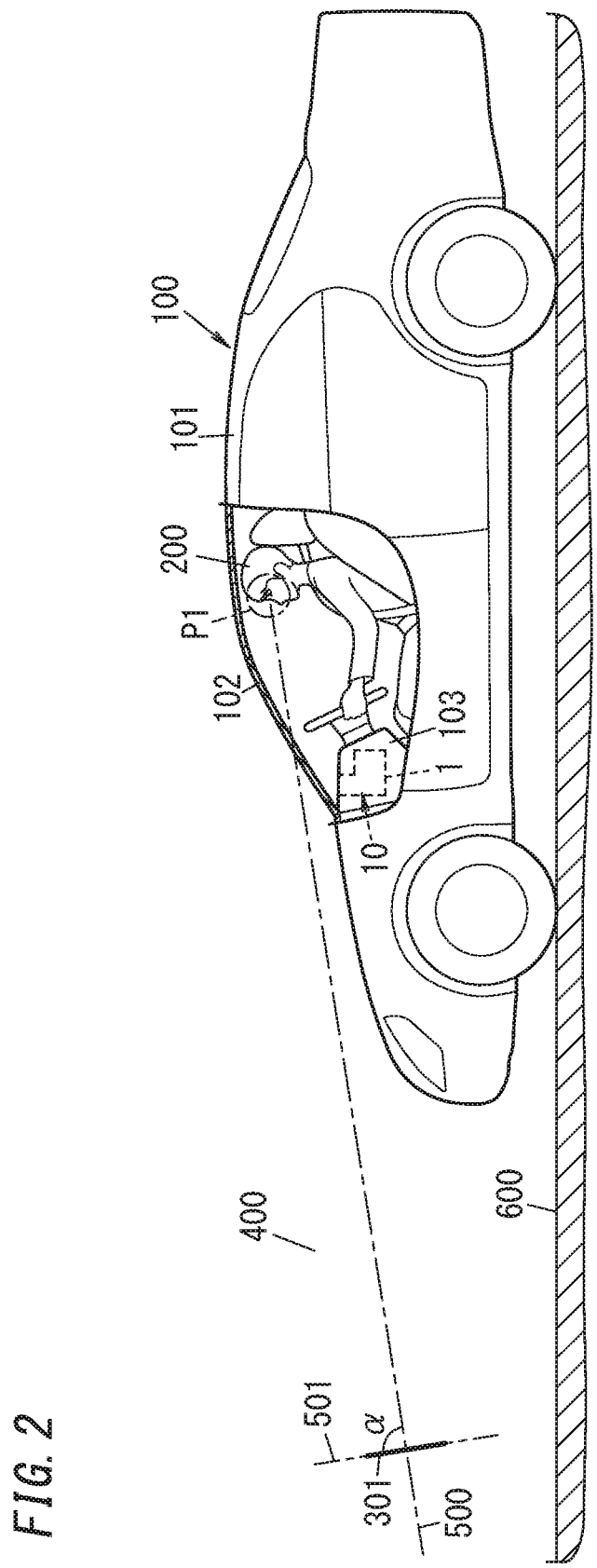
FIG. 2 schematically depicts a moving vehicle including the video display system.

A video display system 10 according to an exemplary embodiment includes a display unit 2, a projection unit 3, and a display control unit 4 as shown in FIGS. 1 and 2.

The display unit 2 displays an image thereon.

The projection unit 3 projects a virtual image 301, corresponding to the image, onto a target space 400 with the outgoing light of the display unit 2.

The display control unit 4 is able to change the projection distance. As used herein, the "projection distance" refers to the distance from the viewpoint of a user 200 who is viewing the virtual image 301 to the virtual image 301 projected onto the target space 400. The display control unit 4 changes the projection distance in a change pattern. The change pattern varies according to situation information.

Such a video display system 10 may be mounted, for example, in a moving vehicle body 101 of a moving vehicle 100 such as an automobile. The user 200 who is boarding the moving vehicle 100 (such as the driver of the moving vehicle 100) recognizes the virtual image 301 displayed by the video display system 10 as if the virtual image 301 were projected onto the target space 400 that is set in front of the moving vehicle 100. As used herein, the "virtual image" refers to an image formed, as if an object were actually present, on the user's 200 eyes by a reflected light beam, when the light beam emerging from the video display system 10 is reflected from a reflector such as the windshield 102 of the moving vehicle 100 to turn into the reflected light beam. The windshield 102 has a light-transmitting property, which allows the user 200 to view the target space 400 in front of the moving vehicle 100 through the windshield 102. This allows the user 200 to view the virtual image 301 projected by the video display system 10 such that the virtual image 301 is superimposed on his or her view of the real space in front of the moving vehicle 100. Thus, this video display system 10 allows the user 200 to be presented as the virtual image 301 with, and visually recognize, various types of driver assistance information including vehicle velocity information, vehicle state information, navigation information, pedestrian information, foregoing vehicle information, and lane deviation information. This allows the user 200 to visually acquire the driver assistance information just by shifting his or her gaze only slightly in the state where he or she is watching the real space in front of the windshield 102. As used herein, the "viewpoint" of the user 200 does not have to be a point in the real space but may also be a predetermined range in which the user's 200 eyes are supposed to be located (i.e., a so-called "eye box"). As long as the user's 200 eyes are located within this range (eye box), the user 200 is allowed to view the virtual image 301 with his or her eyes. Also, as used herein, the "projection distance" refers to the distance from the user's 200 viewpoint (eye box) to a representative point of the virtual image 301 (which is a point of the virtual image 301, to which the user 200 fixes his or her gaze, and which may be the center of gravity of the virtual image 301, for example). The eye box is a predefined range of viewpoints in which the virtual image 301 is viewable. Also, the "change pattern" of the projection distance refers herein to the manner of changing the projection distance (i.e., how to change the projection distance) and may refer to a change rate for changing the projection distance (hereinafter referred to as a "projection distance change rate"), for example. Furthermore, as used herein, the "situation information" includes traveling information about the traveling state of the moving vehicle 100 with the video display system 10 (such as information about its velocity, control state, and other parameters) and/or environmental information about the environment surrounding the video display system 10 (such as the brightness, vibrations, and other parameters).

According to this embodiment, the display control unit 4 changes the projection distance in a change pattern varying according to the situation information. This allows the projection distance to be changed in such a change pattern that makes a change in the virtual image 301 (e.g., a change of the virtual image 301 itself or a change in the projection distance of the virtual image 301) much less noticeable. This makes the change in the projection distance of the virtual image 301 being projected onto the target space 400 hardly sensible. This reduces the chances of the user 200 sensing the change in the projection distance of the virtual image 301 or finding the virtual image 301 unnatural.

(2) Details

Next, a video display system 10 according to an exemplary embodiment and a moving vehicle 100 including the video display system 10 will be described in detail with reference to the accompanying drawings.

(2.1) Configuration

A video display system 10 according to an exemplary embodiment may be implemented as a head-up display (HUD) to be mounted in a moving vehicle 100 such as an automobile as shown in FIGS. 1 and 2. That is to say, the moving vehicle 100 includes the video display system 10 and a moving vehicle body 100 in which the video display system 10 is installed.

This video display system 10 is installed in the vehicle cabin of the moving vehicle 100 so as to project an image onto the windshield 102 (reflector) of the moving vehicle 100 from under the windshield 102. In the example illustrated in FIG. 2, the video display system 10 is arranged in a dashboard 103 under the windshield 102. When an image is projected onto the windshield 102 from the video display system 10, the user 200 recognizes the image projected onto the windshield 102 as a virtual image 301 displayed in the target space 400 set in front of (and outside of) the moving vehicle 100.

Figure 3:
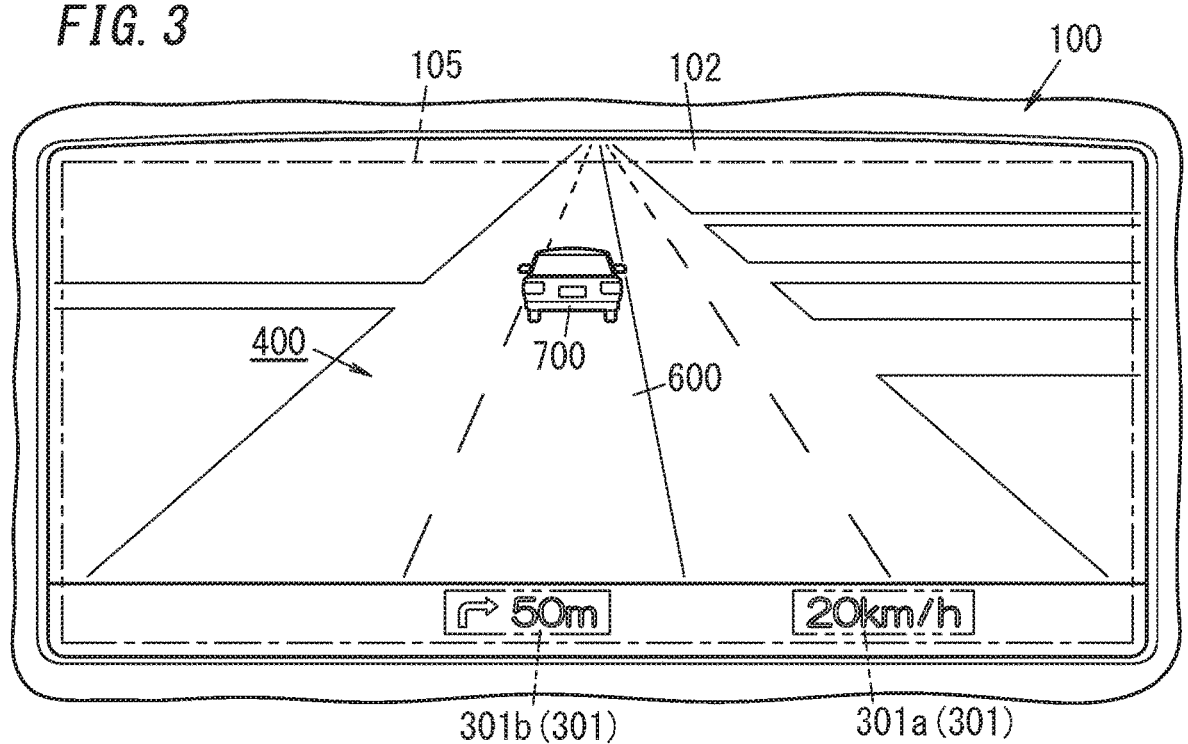
FIG. 3 conceptually illustrates the user's field of view when the video display system is used.

As used herein, the "virtual image" refers to an image formed, as if an object were actually present, on the user's 200 eyes by a reflected light beam, when the light beam emerging from the video display system 10 is reflected from a reflector such as the windshield 102 to turn into the reflected light beam. In other words, the light beam projected by the video display system 10 onto the windshield 102 is reflected from the windshield 102 to form an image on the user's 200 eyes, thus making the user 200 recognize a virtual image that looks, to his or her eyes, as if the virtual image were actually projected at a predetermined projection distance. This allows the user 200 who is boarding the moving vehicle 100 to view the virtual image 301 projected by the video display system 10 such that the virtual image 301 is superimposed on his or her view of the real space in front of the moving vehicle 100 as shown in FIG. 3. Thus, this video display system 10 allows the user 200 to be presented, as the virtual image 301 superimposed on his or her view of the real space in front of the moving vehicle 100, with, and visually recognize, various types of driver assistance information. Although the virtual image displayed by the video display system 10 is formed on the user's 200 eyes, the virtual image will be regarded in the following description as being "projected" at the predetermined projection distance by the video display system 10 for the sake of convenience.

The virtual image 301 projected onto the target space 400 by the video display system 10 is displayed on a virtual plane 501. The virtual plane 501 is a plane, of which the tilt angle α with respect to the optical axis 500 of the video display system 10 is larger than a predetermined value γ (i.e., a virtual plane that satisfies α>γ). As used herein, the "optical axis 500" refers to a direction in which the light is incident on the user's 200 eyes (i.e., his or her viewpoint) via the projection unit 3. More specifically, the optical axis 500 is a direction in which the light that has emerged from the projection unit 3 and has been reflected from the windshield 102 is incident on the user's 200 eyes (i.e., his or her viewpoint P1), and extends along an optical path that connects the user's 200 eyes (viewpoint P1) and the position of the virtual image 301 together. The optical axis 500 extends, in the target space 400 in front of the moving vehicle 100, along the road surface 600 in front of the moving vehicle 100. In this example, the predetermined value γ may be 45 degrees, for example, and the tilt angle α may be 90 degrees, for example. The virtual plane 501 on which the virtual image 301 is formed is substantially perpendicular to the road surface 600. For example, if the road surface 600 is a horizontal plane, the virtual image 301 is displayed on a vertical plane. Therefore, the virtual image 301 formed on the virtual plane 501 is recognized by the user 200 as being located on a plane that is generally perpendicular to the road surface 600.

The virtual image 301 has its projection distance varied according to the velocity of the moving vehicle 100, for example. The display control unit 4 changes, in accordance with a change pattern, the projection distance of the virtual image 301 being displayed on the virtual plane 501. The change pattern of changing the projection distance of the virtual image 301 varies according to the situation information.

The virtual image 301 includes a first virtual image 301a and a second virtual image 301b to be displayed only when an event occurs. As used herein, the "event" refers to an event that triggers display of the second virtual image 301b. The event includes a situation that requires the navigation system to provide some kind of notification information for the user 200 and/or a situation that requires providing some kind of alert information about some abnormal condition of the moving vehicle 100 or an alarm for the user 200. In the example illustrated in FIG. 3, the first virtual image 301a is projected onto a bottom left or right area of the windshield 102 and the second virtual image 301b is projected onto a bottom center area of the windshield 102. However, this is only an example and should not be construed as limiting. The display locations of the first virtual image 301a and the second virtual image 301b may be changed appropriately. For example, the first virtual image 301a may be projected onto a lower area of the windshield 102 and the second virtual image 301b may be projected onto an upper area of the windshield 102.

The first virtual image 301a is a virtual image providing, for example, the traveling information about the traveling state of the moving vehicle 100 and/or environmental information about the environment surrounding the moving vehicle 100. The first virtual image 301a is always displayed while the moving vehicle 100 is traveling, as a matter of principle. If necessary, however, the display of the first virtual image 301a may be suspended temporarily. Examples of the traveling information include at least one of velocity information indicating the velocity (vehicle velocity) of the moving vehicle 100, distance information, or time information. Examples of the distance information include at least one of the total distance traveled by the moving vehicle 100, the distance traveled from a predetermined origin, or the remaining distance to travel to arrive at the destination entered into the navigation system. Examples of the time information include at least one of the current time or the estimated time of arrival at the destination. Examples of the environmental information include at least one of the environmental temperature, the wind velocity, the wind direction, or the weather. In the example illustrated in FIG. 3, the first virtual image 301a is a character string (e.g., "20 km/h") indicating the velocity of the moving vehicle 100. However, the first virtual image 301a does not have to indicate the velocity but may be changed as appropriate.

The second virtual image 301b is displayed to present at least one of a first type of notification information provided by the navigation system at a predetermined timing or a second type of notification information about some abnormal condition of the moving vehicle 100 or an alarm. Examples of the first type of notification information include information indicating the distance and traveling direction to a point to make a right or left turn and information about road signs (e.g., information about the velocity limit indicated by one of the road signs) set on the road along which the moving vehicle 100 is now traveling. Examples of the second type of notification information include notification information about any abnormality that has occurred to the moving vehicle 100 or notification information provided as an alarm to some dangerous situation requiring caution for the user 200 while driving the moving vehicle 100. Examples of the abnormality of the moving vehicle 100 include a malfunction of the engine or battery, failure to close a door, and failure to wear the seatbelt. Examples of such alarms to dangerous situations that require caution for the user 200 of the moving vehicle 100 include an alarm to the lane deviation of the moving vehicle 100, an alarm to the approach to some obstacle, an alarm to the excessive proximity of the foregoing or following vehicle, and an alarm to the moving vehicle's 100 excess of the velocity limit.

In this case, the second virtual image 301b shown as an example in FIG. 3 is a piece of notification information provided by the navigation system when the moving vehicle 100 is approaching a point to change its traveling direction. The second virtual image 301b is made up of a sign (such as an arrow) indicating the turning direction and a character string indicating the distance to the point to change the traveling direction (e.g., "50 m"). Note that the second virtual image 301b does not have to be the notification information provided by the navigation system at a predetermined timing but may also be changed appropriately.

The first virtual image 301a and the second virtual image 301b may present these pieces of information in the forms of characters, numerals, signs and meter icons (e.g., a tachometer icon or a fuel gauge icon), for example.

As can be seen, the video display system 10 according to this embodiment is able to display, on the virtual plane 501, the virtual image 301 including at least one of the first virtual image 301a or the second virtual image 301b. The video display system 10 projects the virtual image 301 such that the virtual image 301 is viewable several to several ten meters ahead of the moving vehicle 100. In addition, the video display system 10 changes the projection distance of the virtual image 301 such that the higher the velocity of the moving vehicle 100 is, the more distant from the moving vehicle 100 the virtual image 301 is viewable. Furthermore, the video display system 10 changes the projection distance of the virtual image 301 in a change pattern varying according to the situation information. Next, the respective constituent elements of the video display system 10 will be described in detail one by one.

The video display system 10 includes a body 1, the display unit 2, the projection unit 3, the display control unit 4, a driving unit 5, an environmental information acquisition unit 6, an angle adjustment receiving unit 7, and a moving vehicle information acquisition unit 8 as shown in FIG. 1.

The body 1 may be implemented as a box made of a synthetic resin, for example. The body 1 houses the display unit 2, the projection unit 3, the display control unit 4, the driving unit 5, the environmental information acquisition unit 6, the angle adjustment receiving unit 7, and the moving vehicle information acquisition unit 8. The body 1 may be fixed, for example, in the dashboard 103 of the moving vehicle 100. The body 1 does not have to be implemented as a box but may also be configured as a frame or a plate member as long as the body 1 is able to house the display unit 2, the projection unit 3, the display control unit 4, the driving unit 5, the environmental information acquisition unit 6, the angle adjustment receiving unit 7, and the moving vehicle information acquisition unit 8 therein and is attachable to the moving vehicle body 101. The shape of the body 1 may be changed appropriately.

The display unit 2 includes a display device such as a liquid crystal display. The liquid crystal display includes a liquid crystal panel and a backlight. The display unit 2 displays an image thereon based on image data provided by the display control unit 4.

The projection unit 3 projects, with the light emerging from the display screen of the display unit 2 (hereinafter referred to as "outgoing light of the display unit 2"), a virtual image 301, corresponding to the image displayed on the display unit 2, onto the target space 400. The video display system 10 according to this embodiment is a head-up display mounted in the moving vehicle 100 such as an automobile, and the projection unit 3 projects the image onto the windshield 102 (see FIG. 2) of the moving vehicle 100. The projected image is formed in a projection area 105 (see FIG. 3) of the windshield 102.

The projection unit 3 includes a first mirror 31 and a second mirror 32 as shown in FIG. 1. The first mirror 31 and the second mirror 32 are arranged in this order along an optical path leading from the display unit 2 to the viewpoint P1 of the user 200. More specifically, the first mirror 31 is arranged over the display screen of the display unit 2 such that the outgoing light of the display unit 2 is incident on the first mirror 31. The first mirror 31 reflects the outgoing light of the display unit 2 toward the second mirror 32. The second mirror 32 is positioned to receive the outgoing light, reflected from the first mirror 31, of the display unit 2 (e.g., in front of and under the first mirror 31). The second mirror 32 reflects the outgoing light, already reflected from the first mirror 31, of the display unit 2 upward (i.e., toward the windshield 102). The first mirror 31 may be a convex mirror, and the second mirror 32 may be a concave mirror, for example. However, this is only an example and should not be construed as limiting. The first mirror 31 does not have to be a convex mirror but may also be a plane mirror or even a concave mirror. Likewise, the second mirror 32 does not have to be a concave mirror but may also be a plane mirror or even a convex mirror. In this embodiment, the light projected from the projection unit 3 is reflected by the windshield 102. Alternatively, the light projected from the projection unit 3 may be reflected from a reflective member arranged in an upper part of the dashboard 103 and then allowed to be incident on the user's 200 eyes.

The display control unit 4 controls the content displayed on the display unit 2. The display control unit 4 generates image data to display the virtual image 301 and outputs the image data thus generated to the display unit 2, thus displaying an image corresponding to the virtual image 301 on the display unit 2. The display control unit 4 also has the function of shifting the display unit 2 in the direction in which light emerges from the display unit 2 by controlling the driving unit 5 for displacing the display unit 2. The display control unit 4 may be implemented as a microcomputer including a processor and a memory. That is to say, the display control unit 4 is implemented as a computer system including a processor and a memory. In other words, the computer system performs the function of the display control unit 4 by making the processor execute a predetermined program. The program may be stored in advance in the memory or may also be downloaded via a telecommunications line such as the Internet or distributed after having been stored on a non-transitory storage medium such as a memory card.

The driving unit 5 shifts the display unit 2 so as to change the projection distance from the user's 200 viewpoint (eye box) to the virtual image 301 projected onto the target space 400. The projection distance varies according to the length of the optical path of the light that has emerged from the display unit 2 to enter the user's 200 eyes (viewpoint) via the projection unit 3. That is to say, the longer the optical path length is, the longer the projection distance is. The driving unit 5 shifts the display unit 2 such that the length of the optical path of the light that has emerged from the display unit 2 to enter the user's 200 eyes (viewpoint) via the projection unit 3 becomes a distance specified by a control instruction given by the display control unit 4. The driving unit 5 may include, for example, a voice coil motor, to which the display unit 2 is fixed. Changing the amount and direction of the current supplied to the voice coil causes the voice coil to reciprocate, thus allowing the display unit 2 to be shifted in the direction in which light emerges from the display unit 2. As can be seen, the driving unit 5 shifting the display unit 2 changes the length of the optical path leading from the display unit 2 to the user's 200 eyes (viewpoint) via the projection unit 3, and thereby changes the projection distance of the virtual image 301. Note that this configuration of the driving unit 5 is only an example and may be changed as appropriate.

The environmental information acquisition unit 6 acquires the environmental information about the environment surrounding the moving vehicle 100 either at regular intervals or at irregular intervals. In this embodiment, the environmental information acquisition unit 6 acquires, as a piece of environmental information about the surrounding environment, information about the brightness of the environment surrounding the video display system 10. The body 1 includes a brightness sensor for detecting the brightness of the environment surrounding the body 1 (video display system 10). The environmental information acquisition unit 6 acquires information about the brightness of the environment surrounding the body 1 based on the value measured by the brightness sensor. Such a sensor for acquiring information about the brightness of the surrounding environment may be an image sensor such as a complementary metal oxide semiconductor (CMOS) image sensor for shooting the environment surrounding the moving vehicle 100. The environmental information acquisition unit 6 is able to acquire information about the brightness of the surrounding environment from pixel values of respective pixels based on the image data acquired from the image sensor.

Note that the environmental information about the surrounding environment does not have to be information about the brightness of the environment surrounding the video display system 10. Alternatively, the environmental information about the surrounding environment may be information about at least one of the brightness of the environment surrounding the video display system 10 and information about the swaying motion of the moving vehicle 100 with the video display system 10, temperature, or humidity.

The angle adjustment receiving unit 7 receives, from the user 200 seated on the driver's seat of the moving vehicle 100, adjustment information for adjusting the angle of depression from which the virtual image 301 is viewed. As used herein, the angle of depression refers to the angle defined by the line of the sight direction connecting the user's 200 viewpoint (eye box) to a representative point of the virtual image 301 with respect to a horizontal plane in a situation where the user 200 looks down on the virtual image 301. The driver's seat of the moving vehicle 100 is equipped with an operating unit for adjusting the angle of depression. The angle adjustment receiving unit 7 receives the adjustment information that the user 200 has entered with the operating unit. In accordance with the adjustment information received from the operating unit, the angle adjustment receiving unit 7 outputs an instruction to adjust the angle of depression to the display control unit 4. In response, the display control unit 4 changes the location of the image displayed on the display unit 2 in accordance with the angle of depression adjustment instruction given by the angle adjustment receiving unit 7, thereby adjusting the angle of depression from which the user 200 views the virtual image 301 projected by the projection unit 3. That is to say, the display control unit 4 is able to change the angle of depression from which the virtual image 301 is viewed from the user's 200 viewpoint (eye box) such that the virtual image 301 is projected at such an angle of depression that allows the user 200 to view the virtual image 301 easily. Note that if the driving unit 5 has the capability of adjusting the orientation of the second mirror 32 of the projection unit 3, then the display control unit 4 may control the driving unit 5 in accordance with the angle of depression adjustment instruction and instruct the driving unit 5 to change the orientation of the second minor 32 to adjust the angle of depression. The driving unit 5 may have the capability of adjusting the orientation of at least one of the optical members that form the projection unit 3, the display unit 2, or the body 1. The angle of depression may be adjusted by making the display control unit 4 control the driving unit 5 in accordance with the angle of depression adjustment instruction and by making the driving unit 5 adjust the orientation of at least one of the optical members that form the projection unit 3, the display unit 2, or the body 1.

The moving vehicle information acquisition unit 8 acquires moving vehicle information about the traveling state of the moving vehicle 100 either at regular intervals or at irregular intervals from an electronic control unit (ECU) 110 over a controller area network (CAN) 111, for example. The moving vehicle information includes at least one of velocity information about the velocity of the moving vehicle 100, notification information provided by the navigation system, or various kinds of alarms (to some abnormality of the moving vehicle 100, approach to an obstacle, lane deviation, and exceeding the velocity limit). Note that the ECU 110 controls a drive system, a steering system, and other systems of the moving vehicle 100 in accordance with the user's 200 command accepted by a human interface. Alternatively, the ECU 110 may also control the drive system, the steering system, and other systems of the moving vehicle 100 in accordance with a control instruction given by an advanced driver assistance system (ADAS).

(2.2) Operation

Next, it will be described with reference to FIGS. 4-6B how the video display system 10 according to this embodiment operates.

Figure 4:
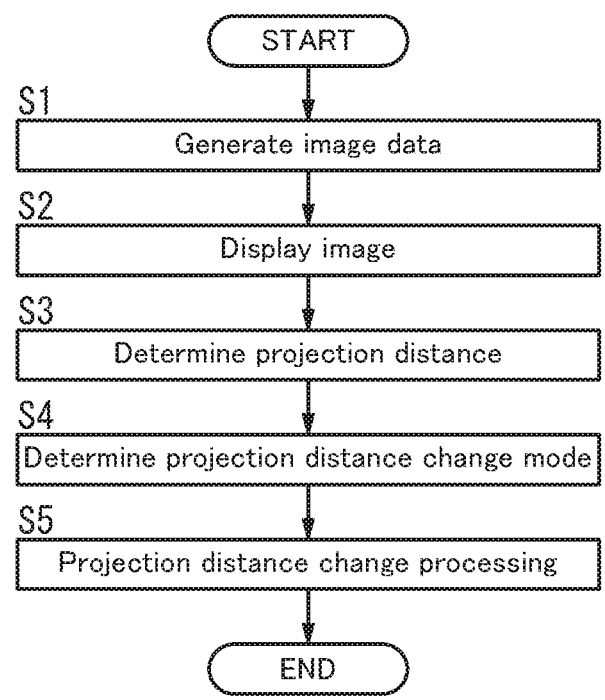
FIG. 4 is a flowchart showing how the video display system operates.

In the following description, it will be described with reference to the flowchart of FIG. 4 how the video display system 10 operates when projecting, as the virtual image 301, the first virtual image 301a indicating the velocity of the moving vehicle 100. When projecting the second virtual image 301b, the video display system 10 also operates in the same way as when projecting the first virtual image 301a, and description thereof will be omitted herein. Note that when a projection operation commonly applicable to the first virtual image 301a and the second virtual image 301b is described, these two virtual images 301a and 301b will be collectively referred to as "virtual images 301."

First, the display control unit 4 retrieves velocity information from the moving vehicle information acquisition unit 8, generates, based on the velocity information, image data representing the first virtual image 301a to indicate the velocity of the moving vehicle 100 (in Step S1), and outputs the image data to the display unit 2. On receiving the image data representing the first virtual image 301a from the display control unit 4, the display unit 2 displays an image based on the image data (in Step S2).

In addition, the display control unit 4 determines the projection distance of the first virtual image 301a based on the velocity information of the moving vehicle 100 (in Step S3). Generally speaking, in a situation where the user 200 who is driving the moving vehicle 100 is looking forward, the higher the velocity of the moving vehicle 100 is, the more distant the user 200 tends to fix his or her gaze. Therefore, to reduce the magnitude of shift of his or her gaze between the situation where he or she is looking at the real space in front of the moving vehicle 100 and the situation where he or she is viewing the first virtual image 301a, the display control unit 4 extends the projection distance of the first virtual image 301a as the velocity of the moving vehicle 100 increases. That is to say, in accordance with the velocity information retrieved from the moving vehicle information acquisition unit 8, the display control unit 4 determines the projection distance of the first virtual image 301a within a predetermined range (e.g., within the range from 3 m to 20 m). On determining the projection distance of the first virtual image 301a, the display control unit 4 outputs a control instruction to the driving unit 5 to shift the display unit 2 to a position corresponding to the projection distance thus determined.

The light emerging from the display screen of the display unit 2 (i.e., the light that produces the image displayed on the display screen) is projected by the projection unit 3 onto the windshield 102 and then reflected from the windshield 102 toward the user's 200 eyes. This allows the user 200 to recognize the image projected onto the windshield 102 as the first virtual image 301a being projected at the projection distance determined by the display control unit 4.

Thereafter, when the velocity of the moving vehicle 100 changes, the display control unit 4 updates the projection distance of the first virtual image 301a based on the velocity information of the moving vehicle 100. Then, the display control unit 4 determines a change pattern of changing the projection distance based on the projection distance determined before the velocity changed and the projection distance determined after the velocity changed (in Step S4).

Figure 5A:
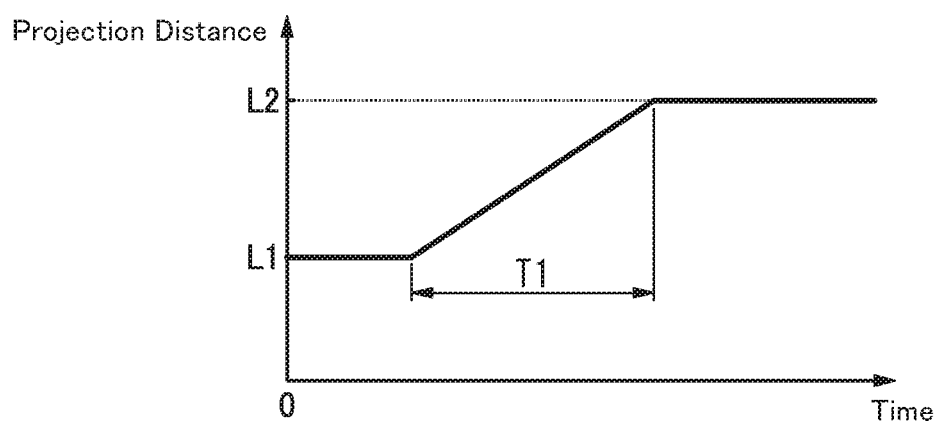
FIGS. 5A and 5B illustrate exemplary change patterns in which the video display system changes the projection distance of a virtual image.

FIG. 5A shows an exemplary change pattern of changing the projection distance of the first virtual image 301a (virtual image 301) when the moving vehicle 100 accelerates. According to the change pattern shown in FIG. 5A, the projection distance of the virtual image 301 is changed linearly over a period of time T1 for change, corresponding to the acceleration period of the moving vehicle 100, from a distance L1 before the change to a distance L2 that has been determined based on the velocity of the moving vehicle 100. In this case, if the moving vehicle 100 accelerates steeply, the period of time T1 for change shortens and the projection distance change rate increases, thus making the distortion of the first virtual image 301a more noticeable when the first virtual image 301a is distorted due to the change of the projection distance. In addition, if the projection distance of the first virtual image 301a changes steeply, the change in the projection distance of the first virtual image 301a becomes more sensible.

Figure 5B:
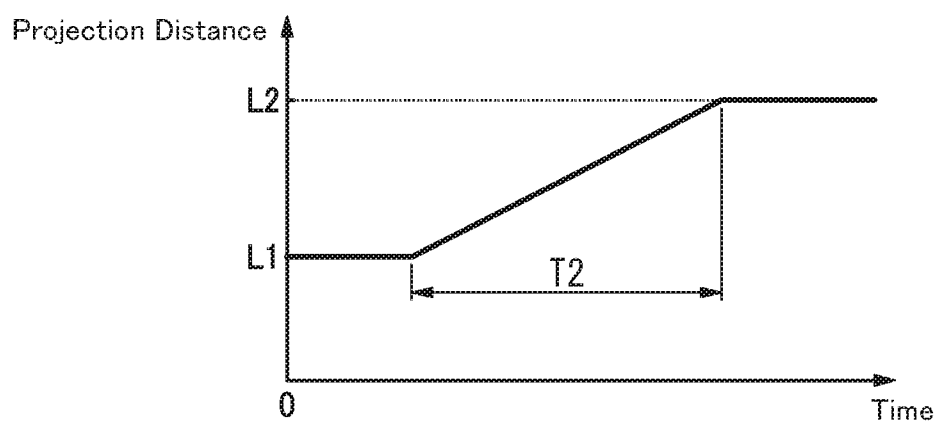

Thus, in the video display system 10 according to this embodiment, the display control unit 4 receives, as distance instruction, the information about the moving vehicle's 100 velocity acquired by the moving vehicle information acquisition unit 8, and changes the projection distance of the virtual image 301 in accordance with the distance instruction. That is to say, the display control unit 4 changes the projection distance of the virtual image 301 in accordance with the distance instruction (e.g., the information about the velocity of the moving vehicle 100 in this example). For this purpose, an upper limit value V1 is set for the magnitude of the change rate for changing the projection distance (hereinafter referred to as "projection distance change rate") of the virtual image 301 If the projection distance change rate in a situation where the projection distance is changed from the distance L1 to the distance L2 over the period of time T1 for change as shown in FIG. 5A is greater than the upper limit value V1, then the display control unit 4 changes the change pattern of the projection distance such that the projection distance change rate becomes equal to or less than the upper limit value V1. That is to say, when changing the projection distance of the virtual image 301, the display control unit 4 changes the change pattern of the projection distance (i.e., how to change the projection distance) in accordance with the velocity information, which is one type of situation information of the moving vehicle 100. In other words, the situation information includes moving vehicle information (such as velocity information) about the moving vehicle 100, and the display control unit 4 changes the projection distance in accordance with the moving vehicle information. For example, the display control unit 4 may change the projection distance of the virtual image 301 linearly from the distance L1 to the distance L2 over a period of time T2 for change (where T2>T1) as shown in FIG. 5B. As can be seen, extending, from T1 to T2, the period of time for changing the projection distance of the virtual image 301 from the distance L1 to the distance L2 makes the projection distance change rate equal to or less than the upper limit V1, thus allowing the projection distance of the virtual image 301 to change more gently. This makes the change in the projection distance of the virtual image 301 much less noticeable, and allows the user 200 to sense the change in the projection distance of the virtual image 301 much less easily, compared with a situation where the projection distance change rate of the virtual image 301 is greater than the upper limit value V1.

On determining the pattern of changing the projection distance of the virtual image 301, the display control unit 4 outputs, to the driving unit 5, a control instruction that the position of the display unit 2 be changed in accordance with the change pattern of the projection distance, and makes the driving unit 5 shift the display unit 2, thereby performing the processing of changing the projection distance (in Step S5). When the driving unit 5 changes the position of the display unit 2, the length of the optical path leading from the display unit 2 to the user's 200 viewpoint changes, and the projection distance of the virtual image 301 changes linearly from the distance L1 to the distance L2 over a period of time T2 for change as the optical path length changes. The display control unit 4 projects the virtual image 301 onto the target space 400 by performing this series of processing steps S1 to S5 repeatedly.

Once the projection distance has been changed, the virtual image 301 is displayed at the projection distance corresponding to the velocity of the moving vehicle 100, thus shortening the amount of time it takes for the user 200 to shift his or her gaze or adjust his or her focus between a situation where the user 200 is viewing the real space in front of the moving vehicle 100 and a situation where he or she is viewing the virtual image 301. In addition, the display control unit 4 also varies the projection distance change pattern according to the situation information of the moving vehicle 100, or the information about the velocity of the moving vehicle 100. For example, if the projection distance change rate is going to exceed the upper limit value V1 due to steep acceleration of the moving vehicle 100, then the display control unit 4 changes the change pattern of the projection distance such that the projection distance change rate becomes equal to or less than the upper limit value V1. This allows the projection distance change rate of the virtual image 301 to be limited to the upper limit value V1 or less, thus making the change in the projection distance of the virtual image 301 much less noticeable for the user 200 than in a situation where the projection distance of the virtual image 301 changes at a change rate greater than the upper limit value V1.

Note that even when shortening the projection distance of the virtual image 301, the display control unit 4 may also determine the change pattern of the projection distance such that the magnitude of the projection distance change rate becomes equal to or less than the upper limit value. When the moving vehicle 100 decelerates, the projection distance of the virtual image 301 is shortened compared to the one before the deceleration. In that case, the display control unit 4 changes the projection distance of the virtual image 301 in such a change pattern that makes the magnitude of the change rate, at which the projection distance of the virtual image 301 is shortened, equal to or less than the upper limit value.

In this embodiment, the display control unit 4 sets the magnitude of the change rate at which the projection distance of the virtual image 301 is extended and the magnitude of the change rate at which the projection distance of the virtual image 301 is shortened at mutually different rates.

Figure 6A:
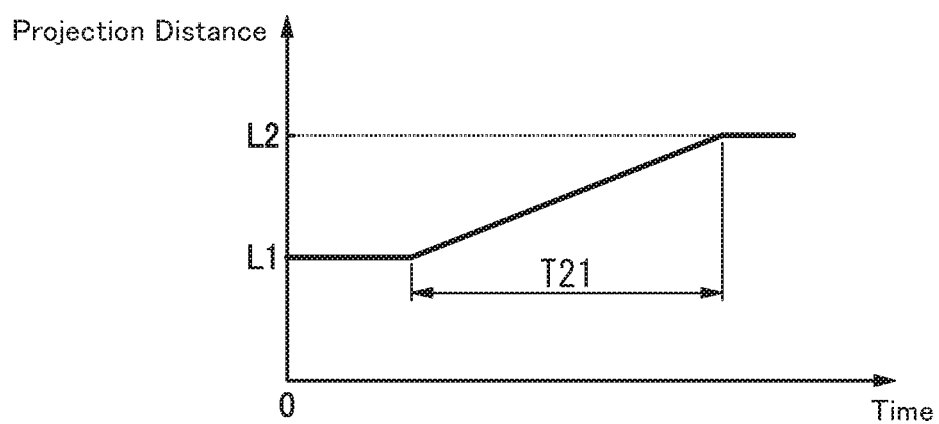
FIG. 6A illustrates an exemplary change pattern adopted when the video display system extends the projection distance of the virtual image.
Figure 6B:
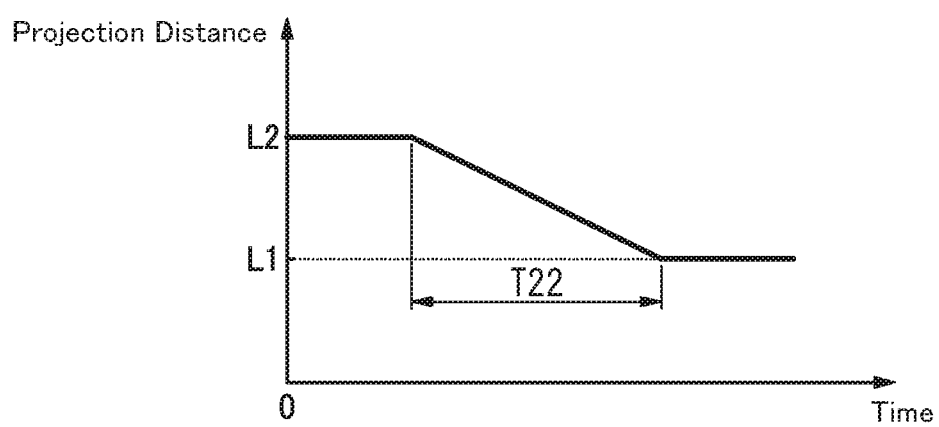
FIG. 6B illustrates an exemplary change pattern adopted when the video display system shortens the projection distance of the virtual image.

FIG. 6A shows an exemplary change pattern for extending the projection distance of the virtual image 301 from the distance L1 to the distance L2. FIG. 6B shows an exemplary change pattern for shortening the projection distance of the virtual image 301 from the distance L2 to the distance L1. According to the change pattern shown in FIG. 6A, the display control unit 4 changes the projection distance of the virtual image 301 linearly over a period of time T21 for change from the distance L1 to the distance L2. On the other hand, according to the change pattern shown in FIG. 6B, the display control unit 4 changes the projection distance of the virtual image 301 linearly over a period of time T22 (where T22<T21) for change from the distance L2 to the distance L1. That is to say, the display control unit 4 makes the change rate for extending the projection distance of the virtual image 301 lower than the change rate for shortening the projection distance of the virtual image 301.

For example, suppose a situation where the moving vehicle 100 decelerates since the foregoing vehicle 700 (see FIG. 3), traveling in front of the moving vehicle 100, has decelerated. In such a situation, if the change rate at which the projection distance of the virtual image 301 is shortened is lower than the rate at which the inter-vehicular distance between the moving vehicle 100 and the foregoing vehicle 700 is shortened, then the virtual image 301 could look as if the virtual image 301 penetrated into the foregoing vehicle 700. The display control unit 4 according to this embodiment makes the change rate for shortening the projection distance of the virtual image 301 higher than the change rate for extending the projection distance, thus enabling the projection distance to change into the one determined by the decreased vehicle velocity when the moving vehicle 100 decelerates. This reduces the chances of the virtual image 301 looking as if the virtual image 301 penetrated into the foregoing vehicle 700. In addition, the display control unit 4 sets the change rate for extending the projection distance of the virtual image 301 at a smaller value than the change rate for shortening the projection distance of the virtual image 301. This makes the change in the projection distance of the virtual image 301 less noticeable when the moving vehicle 100 accelerates. Note that the change rate for extending the projection distance of the virtual image 301 and the change rate for shortening the projection distance of the virtual image 301 do not have to be different from each other but may also be equal to each other.

Optionally, the display control unit 4 may change the display mode in which the display unit 2 displays the image based on at least one of the projection distance of the virtual image 301 or the angle of depression from which the user 200 views the virtual image 301 from his or her viewpoint. As used herein, the processing of changing the display mode of the image includes at least one of the processing of changing the luminance of the display unit 2 or the processing of blurring the image displayed on the display unit 2. Also, when changing the projection distance of the virtual image 301, the display control unit 4 performs, based on the projection distance and angle of depression of the virtual image 301, at least one of the processing of decreasing the luminance of the display unit 2 or the processing of blurring the image displayed on the display unit 2.

For example, when changing the projection distance of the virtual image 301, the display control unit 4 decreases the luminance of the display unit 2 compared with a situation where the projection distance of the virtual image 301 is not changed, and also decreases the luminance of the display unit 2 as the projection distance is shortened. This makes the change in the projection distance of the virtual image 301 less noticeable. Optionally, when changing the projection distance of the virtual image 301, the display control unit 4 may perform blur processing on the image displayed on the display unit 2 to make the image more blurry compared with a situation where the projection distance of the virtual image 301 is not changed, and may also enhance the effect of the blur processing as the projection distance is shortened.

Also, the display control unit 4 may decrease the luminance of the display unit 2 as the angle of depression of the virtual image 301 decreases (i.e., as the level of the virtual image 301 displayed rises), thus making the change in the projection distance of the virtual image 301 less noticeable. Optionally, the display control unit 4 may also perform blur processing to increase the degree of blur of the image displayed on the display unit 2 as the angle of depression of the virtual image 301 decreases (i.e., as the level of the virtual image 301 displayed rises), thus making the change in the projection distance of the virtual image 301 even less noticeable.

Optionally, the display control unit 4 may make the virtual image 301 displayed flickering just before changing the projection distance of the virtual image 301, and may change the projection distance by controlling the driving unit 5 to shift the display unit 2, only while the virtual image 301 is not displayed. This makes the projection distance of the virtual image 301 unchangeable while the virtual image 301 is displayed, thus making the change in the projection distance of the virtual image 301 hardly noticeable.

Furthermore, the display control unit 4 may also change the projection distance of the virtual image 301 while performing fade-in control for gradually increasing the luminance of the virtual image 301 from an extinct state. Alternatively, the display control unit 4 may also change the projection distance of the virtual image 301 while performing fade-out control for gradually decreasing the luminance of the virtual image 301 fully displayed until the virtual image 301 goes extinct completely. Having the display control unit 4 change the projection distance of the virtual image 301 while performing either the fade-in control or the fade-out control makes the change in the projection distance of the virtual image 301 much less noticeable.

Figure 7:
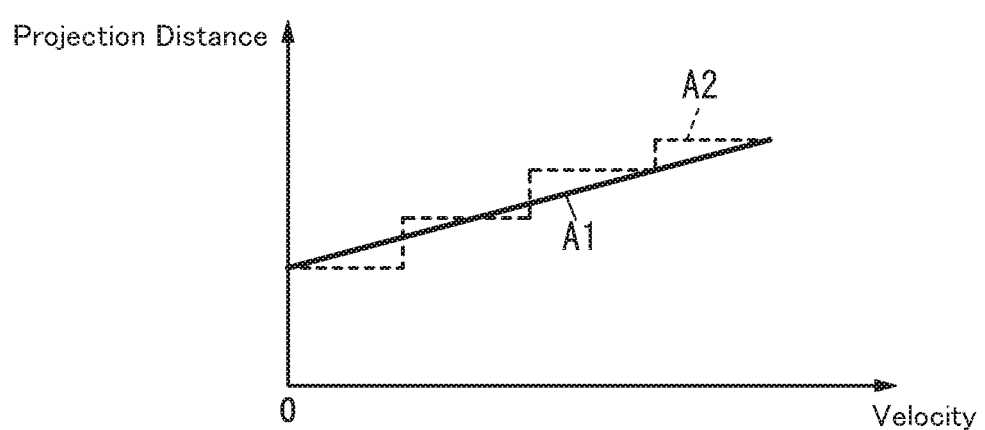
FIG. 7 illustrates how the projection distance of the virtual image changes with the velocity of the moving vehicle in the video display system.

In the embodiment described above, the situation information includes input information (such as velocity information) related to the projection distance, and the display control unit 4 changes the projection distance of the virtual image 301 as the value of the input information varies. In addition, in the embodiment described above, the display control unit 4 changes the projection distance of the virtual image 301 continuously (as indicated by the line graph A1 in FIG. 7) as the value of the input information varies. Alternatively, the display control unit 4 may also change the projection distance of the virtual image 301 stepwise (as indicated by the dotted graph A2 in FIG. 7). In that case, the display control unit 4 changes the projection distance stepwise as the value of the input information (such as the velocity information) varies, thus requiring the driving unit 5 to change the projection distance much less frequently and extending the life of a mechanism for changing the projection distance of the virtual image 301 (i.e., the life of the driving unit 5).

(3) Variations

The embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the video display system 10 may be implemented as a video display method, a computer program, or a non-transitory storage medium that stores the computer program thereon, for example. A video display method according to an aspect includes changing, in a change pattern varying according to situation information, a projection distance from a user's 200 viewpoint to a virtual image 301 projected onto a target space 400 with outgoing light of a display unit 2. A (computer) program according to another aspect is designed to make a computer system execute the video display method described above.

Next, variations of the embodiment described above will be enumerated one after another. Note that any of the variations to be described below may be combined as appropriate.

The agent that carries out the functions of the video display system 10 or the video display method according to the present disclosure includes a computer system. In that case, the computer system may include, as principal hardware components, a processor and a memory. The functions of the video display system 10 or the agent that carries out the video display method according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips without limitation. Those multiple chips may be integrated together in a single device or distributed in multiple devices without limitation.

Also, in the embodiment described above, the video display system 10 is implemented as a single device with various functions thereof implemented in a single housing (body 1). However, this is only an example and should not be construed as limiting. Alternatively, those functions of the video display system 10, namely, the functions of the display unit 2, the projection unit 3, and the display control unit 4, may be distributed in multiple different devices. Still alternatively, the function of at least one of the display unit 2, the projection unit 3, or the display control unit 4, may be distributed in two or more different devices. Optionally, the display control unit 4 may be implemented as a cloud computing system as well.

(3.1) First Variation

In a video display system 10 according to a first variation, the display control unit 4 changes the projection distance in such a change pattern that the change rate for changing the projection distance decreases as the projection distance is shortened, which is a major difference from the exemplary embodiment described above. Note that the video display system 10 according to the first variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

Figure 8:
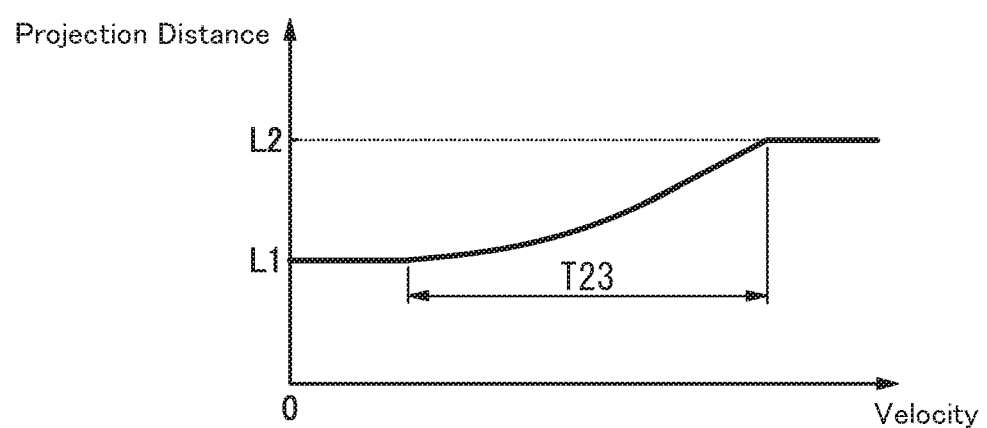
FIG. 8 illustrates an exemplary change pattern adopted when a video display system according to a first variation of the exemplary embodiment of the present disclosure extends the projection distance of the virtual image.

FIG. 8 shows an exemplary change pattern in which the video display system 10 according to the first variation changes the projection distance of the virtual image 301. The display control unit 4 changes, when the moving vehicle 100 accelerates, the projection distance of the virtual image 301 from a distance L1 to a distance L2 over a period of time T23 (where T23>T21) for change. The display control unit 4 restricts the change rate for changing the projection distance to an upper limit value or less, and slows down the projection distance change rate when the projection distance of the virtual image 301 is relatively short, compared with when the projection distance of the virtual image 301 is relatively long. That is to say, in this variation, the situation information is the projection distance of the virtual image 301, and the display control unit 4 changes the projection distance in such a change pattern that the projection distance change rate decreases as the projection distance of the virtual image 301 is shortened.

If the projection distance of the virtual image 301 is as short as in this variation, the change in the projection distance of the virtual image 301 becomes more easily noticeable for the user 200 than in a situation where the projection distance of the virtual image 301 is long. In other words, when the virtual image 301 is displayed near the user 200, the change in the projection distance of the virtual image 301 is more easily noticeable for him or her than when the virtual image 301 is displayed far away from him or her. According to the change pattern shown in FIG. 8, the display control unit 4 decreases the projection distance change rate when the projection distance of the virtual image 301 is relatively short, compared with when the projection distance of the virtual image 301 is relatively long. This causes the projection distance to change gently, thus making the change in the projection distance of the virtual image 301 much less noticeable for the user 200. Note that in this first variation, it is also recommended that the display control unit 4 restrict the change rate for changing the projection distance of the virtual image 301 to the upper limit value V1 or less, which would make the change in the projection distance of the virtual image 301 much less noticeable.

(3.2) Second Variation

In a video display system 10 according to a second variation, the situation information includes control information about a status of control of various parameters, other than the velocity, of the moving vehicle 100. Examples of such control information include information about a gas pedal (accelerator pedal) position and a brake pedal position. In addition, in the video display system 10 according to the second variation, the display control unit 4 regulates, in accordance with the control information, the change rate for changing the projection distance of the virtual image 301, which is a major difference from the exemplary embodiment described above. Note that the video display system 10 according to the second variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

The moving vehicle information acquisition unit 8 acquires not only the information about the velocity of the moving vehicle 100 but also moving vehicle information about the status of control of various parameters, other than the velocity, of the moving vehicle 100 from the ECU 110 over the controller area network (CAN) 111. For example, the moving vehicle information acquisition unit 8 acquires information about an accelerator pedal position and a brake pedal position from the ECU 110.

When varying the projection distance of the virtual image 301 according to the velocity of the moving vehicle 100, the display control unit 4 regulates the change rate for changing the projection distance of the virtual image 301 in accordance with the control information about the status of control of various parameters other than the velocity. For example, as the accelerator pedal is pressed deeper and deeper (i.e., the larger the degree of acceleration is), the display control unit 4 increases the magnitude of the change rate for extending the projection distance of the virtual image 301. Meanwhile, as the brake pedal is pressed deeper and deeper (i.e., the larger the degree of deceleration is), the display control unit 4 increases the magnitude of the change rate for shortening the projection distance of the virtual image 301. This allows the projection distance of the virtual image 301 to change more quickly in response to any variation in the status of control of the moving vehicle 100. That is to say, this increases the responsivity of the change in the projection distance to the variation in the status of control of the moving vehicle 100. Note that in this second variation, it is also recommended that the display control unit 4 restrict the change rate for changing the projection distance of the virtual image 301 to the upper limit value V1 or less, which would make the change in the projection distance of the virtual image 301 much less noticeable.

(3.3) Third Variation

In a video display system 10 according to a third variation, the display control unit 4 changes the projection distance of the virtual image 301 in a change pattern varying according to the surrounding environment, which is a major difference from the exemplary embodiment described above. Note that the video display system 10 according to the third variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

The environmental information acquisition unit 6 acquires, as environmental information about the surrounding environment, brightness information about the brightness of the surrounding environment from a brightness sensor provided for the video display system 10. In the video display system 10 according to the third variation, the situation information includes brightness information about the brightness of the surrounding environment. Also, when varying the projection distance of the virtual image 301 according to the velocity of the moving vehicle 100, the display control unit 4 regulates, in accordance with the brightness information, the change rate for changing the projection distance of the virtual image 301.

For example, when varying the projection distance of the virtual image 301 according to the velocity of the moving vehicle 100, the display control unit 4 decreases the change rate for changing the projection distance of the virtual image 301, as the brightness of the surrounding environment increases. The brighter the environment surrounding the body 1 (video display system 10) is (i.e., the brighter the target space 400 to which the virtual image 301 is projected is), the deeper the depth of focus tends to be, which makes the change in the projection distance of the virtual image 301 more easily noticeable for the user 200. In other words, if the display control unit 4 decreases the change rate for changing the projection distance of the virtual image 301 as the brightness of the surrounding environment increases, then the change in the projection distance of the virtual image 301 becomes less noticeable for the user 200.

Alternatively, when varying the projection distance of the virtual image 301 according to the velocity of the moving vehicle 100, the display control unit 4 may decrease the change rate for changing the projection distance of the virtual image 301 as the brightness of the surrounding environment decreases. When the brightness of the surrounding environment is low, the virtual image 301 projected by the video display system 10 looks relatively bright.

Thus, the display control unit 4 may decrease the change rate for changing the projection distance of the virtual image 301 as the brightness of the surrounding environment decreases, which would make the change in the projection distance of the virtual image 301 less noticeable for the user 200.

(3.4) Fourth Variation

In a video display system 10 according to a fourth variation, the display control unit 4 extends the projection distance in a range where the moving vehicle's 100 velocity is lower than a reference velocity V3 (e.g., a velocity falling within the range from 60 km/h to 80 km/h) in a situation where the angle of depression is equal to or smaller than a predetermined angle (of, e.g., about 4 degrees) compared with when the angle of depression is larger than the predetermined angle, which is a major difference from the exemplary embodiment described above. In this case, supposing the projection distance of the virtual image 301 is the same, the virtual image 301 is displayed at a higher level when the angle of depression is equal to or less than the predetermined angle than when the angle of depression is larger than the predetermined angle. Note that the video display system 10 according to the fourth variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

Figure 9:
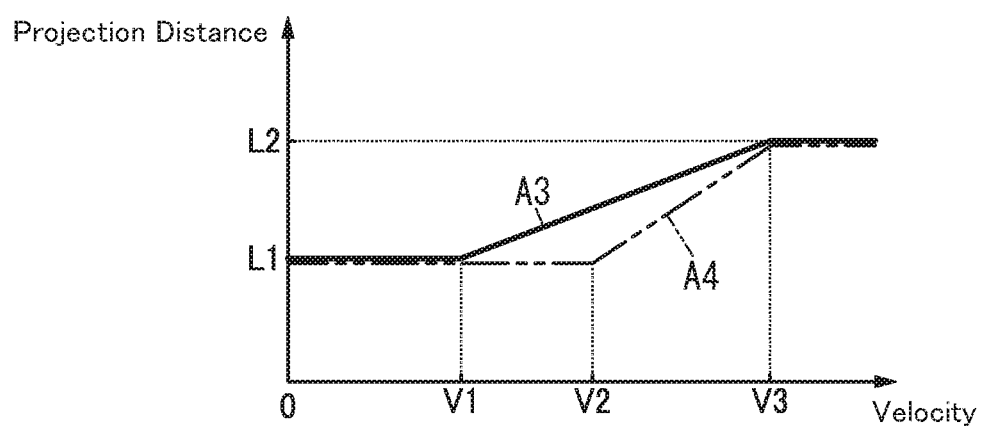
FIG. 9 illustrates how the projection distance of the virtual image changes with the velocity of the moving vehicle in a video display system according to a fourth variation of the exemplary embodiment of the present disclosure.

FIG. 9 shows how the projection distance of the virtual image 301 projected by the video display system 10 according to the fourth variation varies according to the velocity of the moving vehicle 100.

In FIG. 9, the line graph A3 shows the relationship between the projection distance of the virtual image 301 and the velocity when the angle of depression is equal to or smaller than a predetermined angle, and the line graph A4 shows the relationship between the projection distance of the virtual image 301 and the velocity when the angle of depression is larger than the predetermined angle.

As shown in FIG. 9, in this fourth variation, when the angle of depression is equal to or smaller than a predetermined angle, the projection distance in a range where the velocity of the moving vehicle 100 is lower than a reference velocity V3 (e.g., in a range where the velocity is lower than V2 (of 40 km/h, for example) and higher than V1 (of 30 km/h, for example)) is extended compared with when the angle of depression is larger than the predetermined angle.

In a situation where the projection distance of the virtual image 301 is short (i.e., when the virtual image 301 is displayed close to the user's 200 eyes), it is more difficult for the user 200 to focus on virtual image 301. In such a situation, the image formed on his or her left-eye tends to shift from the image formed on his or her right eye, and therefore, the virtual image 301 may give a double vision to him or her. The user 200 may find such a double-looking virtual image 301 displayed at a high level annoying.

According to the fourth variation, when the angle of depression is equal to or smaller than a predetermined angle, the display control unit 4 extends the projection distance in a range where the velocity of the moving vehicle 100 is lower than a reference velocity V3 compared with when the angle of depression is larger than the predetermined angle, thus reducing the chances of the virtual image 301 giving such a double vision. This shortens the amount of time it takes for the user 200 to focus on the virtual image 301 and makes the virtual image 301 easily viewable for him or her. In addition, reducing the chances of the virtual image 301 giving a double vision also makes the change in the projection distance less noticeable for the user 200. Besides, varying the projection distance of the virtual image 301 according to the velocity of the moving vehicle 100 causes a decrease in the projection distance change rate, thus making the change in the projection distance of the virtual image 301 less noticeable for the user 200, too.

(3.5) Fifth Variation

In a video display system 10 according to a fifth variation, the display control unit 4 displays the first virtual image 301a and the second virtual image 301b differently, which is a major difference from the exemplary embodiment described above. Specifically, when the projection distance is shorter than a predetermined distance, the display control unit 4 decreases the brightness of the first virtual image 301a and shortens the duration of projection of the second virtual image 301b, without changing the brightness of the second virtual image 301b, compared with when the projection distance is equal to or longer than the predetermined distance. The predetermined distance may be a distance close to the lower limit of a range where the projection distance is changeable. The predetermined distance is obtained as the sum of the projection distance when the moving vehicle 100 is at a stop and a predetermined margin (of 1 to 2 meters, for example). For instance, if the projection distance when the moving vehicle 100 is at a stop is 5 meters, then the predetermined distance may be set at a distance of about 7 meters. Note that the video display system 10 according to the fifth variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

The display control unit 4 decreases the brightness of the first virtual image 301a when the projection distance is shorter than the predetermined distance compared with when the projection distance is equal to or longer than the predetermined distance, thus making the first virtual image 301a displayed less easily viewable. This makes the change in the projection distance of the first virtual image 301a less noticeable.

In addition, the display control unit 4 also shortens the duration of projection of the second virtual image 301b, without changing the brightness of the second virtual image 301b, when the projection distance is shorter than the predetermined distance, compared with when the projection distance is equal to or longer than the predetermined distance. Since the brightness of the second virtual image 301b is not changed in that case, the second virtual image 301b displayed remains easily viewable. Besides, shortening the duration of projection of the second virtual image 301b makes the change in the projection distance of the second virtual image 301b less noticeable.

(3.6) Other Variations

In the exemplary embodiment described above, the display unit 2 is implemented as a display device such as a liquid crystal display (LCD). However, this is only an example and should not be construed as limiting. Alternatively, the display unit 2 may also be implemented as a different type of display device such as an organic electroluminescent (OEL) display device, instead of an LCD. In addition, the display unit 2 does not have to be a display device such as an LCD, but may also include a projector for projecting light onto a screen. In that case, the projector may be implemented as either a rear projector for displaying an image on the surface of a screen by projecting light from behind the screen or a front projector for displaying an image on the surface of a screen by projecting light from the front of the screen. Alternatively, the projector may also be a scanning projector for producing an image on a screen by scanning the object with light (such as a laser beam) emitted from behind or the front of the screen.

Also, in the exemplary embodiment described above, the projection unit 3 includes two mirrors (namely, the first minor 31 and the second mirror 32) as optical members for making the outgoing light of the display unit 2 incident on the user's 200 eyes. However, this is only an example and should not be construed as limiting. The projection unit 3 does not have to include the mirrors. Alternatively, the projection unit 3 may include at least one of a mirror or a lens as at least one optical member. That is to say, the number of the optical member that is at least one of a mirror or a lens may be either single or plural.

Furthermore, in the exemplary embodiment described above, the driving unit 5 shifts the display unit 2 in accordance with a control instruction from the display control unit 4 to change the projection distance of the virtual image 301. However, the display unit 2 does not have to be shifted to change the projection distance of the virtual image 301. Alternatively, the projection distance of the virtual image 301 may also be changed by making the driving unit 5 shift at least one of the first mirror 31 or the second mirror 32 of the projection unit 3 in accordance with a control instruction from the display control unit 4. Still alternatively, if the projection unit 3 includes a lens as an optical member, the projection distance of the virtual image 301 may be changed by making the driving unit 5 shift the lens in accordance with a control instruction from the display control unit 4. Yet alternatively, if the projection unit 3 includes a lens such as a liquid crystal lens as an optical member, the projection distance of the virtual image 301 may be changed by making the driving unit 5 adjust the focal length of the liquid crystal lens with the voltage applied to the liquid crystal lens varied.

Furthermore, in the exemplary embodiment described above, the environmental information acquisition unit 6 acquires environmental information about the surrounding environment (such as brightness information) from the sensor provided for the body 1. However, this is only an example and should not be construed as limiting. Alternatively, the environmental information acquisition unit 6 may also acquire the environmental information from a sensor provided for the moving vehicle 100 over the controller area network 111. In that case, the environmental information acquisition unit 6 may acquire the environmental information from the sensor provided for the moving vehicle 100 either directly or via the ECU 110, for example.

Furthermore, in the embodiment described above, when the display control unit 4 changes the projection distance of the virtual image 301, the change pattern of the projection distance may be varied according to the content of the virtual image 301. For example, if the content of the virtual image 301 is some kind of emergent information such as an alarm, then the display control unit 4 may change the projection distance of the virtual image 301 at a change rate exceeding the upper limit value described above.

Furthermore, in the embodiment described above, the video display system 10 is implemented as a head-up display. However, this is only an example and should not be construed as limiting. Alternatively, the video display system 10 may also be implemented as a head mounted display (HMD) designed to be worn by the user 200 over his or her head.

Furthermore, in the foregoing description of embodiments, if one of two values being compared with each other (such as the projection distance change rates) is "greater than" the other, the phrase "greater than" may also be a synonym of the phrase "equal to or greater than" that covers both a situation where these two values are equal to each other and a situation where one of the two values is greater than the other. That is to say, it is arbitrarily changeable, depending on selection of a reference value or any preset value, whether or not the phrase "greater than" covers the situation where the two values are equal to each other. Therefore, from a technical point of view, there is no difference between the phrase "greater than" and the phrase "equal to or greater than." Similarly, the phrase "equal to or less than" may be a synonym of the phrase "less than" as well, in the embodiment described above.

(Resume)

As can be seen from the foregoing description, a video display system (10) according to a first aspect includes a display unit (2), a projection unit (3), and a display control unit (4). The display unit (2) displays an image thereon. The projection unit (3) projects a virtual image (301) corresponding to the image onto a target space (400) with outgoing light of the display unit (2). The display control unit (4) is able to change a projection distance from a viewpoint of a user (200), who is viewing the virtual image (301), to the virtual image (301) projected onto the target space (400). The display control unit (4) changes the projection distance in a change pattern. The change pattern varies according to situation information.

This aspect allows, even when distortion is produced in a virtual image (301) while the projection distance of the virtual image (301) is being changed, the projection distance to be changed in a change pattern that makes the distortion of the virtual image (301) much less noticeable. This provides a video display system (10) that makes the change in the projection distance of the virtual image (301) much less noticeable.

In a video display system (10) according to a second aspect, which may be implemented in conjunction with the first aspect, the display control unit (4) is able to change an angle of depression from which the virtual image (301) is viewed from the user's (200) viewpoint.

This aspect allows the virtual image (301) to be projected at such an angle of depression from which the virtual image (301) is easily viewable for the user (200).

In a video display system (10) according to a third aspect, which may be implemented in conjunction with the first or second aspect, the display control unit (4) changes, based on at least one of the projection distance or the angle of depression from which the virtual image (301) is viewed from the user's (200) viewpoint, a display mode for the display unit (2) to display the image.

This aspect allows the display mode of the virtual image (301) to be changed based on at least one of the projection distance or the angle of depression.

In a video display system (10) according to a fourth aspect, which may be implemented in conjunction with any one of the first to third aspects, the display control unit (4) changes the projection distance in accordance with a distance instruction. The display control unit (4) sets an upper limit value to magnitude of a change rate for changing the projection distance.

This aspect makes the change in the projection distance of the virtual image (301) much less noticeable.

In a video display system (10) according to a fifth aspect, which may be implemented in conjunction with the fourth aspect, the magnitude of the change rate for shortening the projection distance is different from the magnitude of the change rate for extending the projection distance.

This aspect allows two different projection distance change rates to be set for a situation where the projection distance of the virtual image (301) is shortened and a situation where the projection distance is extended, respectively.

In a video display system (10) according to a sixth aspect, which may be implemented in conjunction with the fourth or fifth aspect, as the projection distance is shortened, the change rate for changing the projection distance decreases.

In general, the shorter the projection distance of the virtual image (301) is, the easier it is for the user to sense the change in the projection distance. Thus, this aspect makes the change in the projection distance less noticeable for the user by decreasing the projection distance change rate as the projection distance is shortened.

In a video display system (10) according to a seventh aspect, which may be implemented in conjunction with any one of the first to sixth aspects, the situation information includes brightness information about brightness of a surrounding environment, and the display control unit (4) regulates, in accordance with the brightness information, a change rate for changing the projection distance.

According to this aspect, the virtual image (301) looks different according to the brightness of the surrounding environment. Thus, the display control unit (4) changing the projection distance at change rates varying with the brightness information makes the change in the projection distance of the virtual image (301) much less noticeable.

In a video display system (10) according to an eighth aspect, which may be implemented in conjunction with any one of the first to seventh aspects, the situation information includes input information associated with the projection distance, and the display control unit (4) changes the projection distance stepwise as a value of the input information varies.

According to this aspect, the display control unit (4) changes the projection distance of the virtual image (301) stepwise, thus reducing the frequency of changing the projection distance and thereby extending the life of a mechanism for changing the projection distance of the virtual image (301).

In a video display system (10) according to a ninth aspect, which may be implemented in conjunction with any one of the first to eighth aspects, the display unit (2), the projection unit (3), and the display control unit (4) are all mounted in a moving vehicle (100). The situation information includes moving vehicle information about the moving vehicle (100). The display control unit (4) changes the projection distance in accordance with the moving vehicle information.

This aspect makes the change in the projection distance much less noticeable even when the display control unit (4) changes the projection distance in accordance with the moving vehicle information.

In a video display system (10) according to a tenth aspect, which may be implemented in conjunction with any one of the first to ninth aspects, the display unit (2), the projection unit (3), and the display control unit (4) are all mounted in a moving vehicle (100). The situation information includes control information about a state of control, other than velocity, of the moving vehicle (100). The display control unit (4) regulates, in accordance with the control information, the change rate for changing the projection distance.

This aspect makes the change in the projection distance much less noticeable even when the display control unit (4) regulates the projection distance change rate in accordance with the control information.

In a video display system (10) according to an eleventh aspect, which may be implemented in conjunction with any one of the first to tenth aspects, the display unit (2), the projection unit (3), and the display control unit (4) are all mounted in a moving vehicle (100). The display control unit (4) changes, in a situation where the moving vehicle's (100) velocity is lower than a reference velocity, the projection distance depending on the angle of depression of the virtual image (301) as viewed from the user's (200) viewpoint. Specifically, the display control unit (4) extends, in the situation, the projection distance from a first distance when the angle of depression is larger than a predetermined angle into a second distance when the angle of depression is equal to or smaller than the predetermined angle.

This aspect makes the change in the projection distance of the virtual image (301) much less noticeable.

In a video display system (10) according to a twelfth aspect, which may be implemented in conjunction with any one of the first to eleventh aspects, the display unit (2), the projection unit (3), and the display control unit (4) are all mounted in a moving vehicle (100). The virtual image (301) includes a first virtual image (301a) and a second virtual image (301b) that is displayed only when a particular event occurs. The display control unit (4) adjusts, when the projection distance is shorter than a predetermined distance, the brightness of the first virtual image (301a) to a first brightness value and also adjusts duration of projection of the second virtual image (301b) to a first duration without changing the brightness of the second virtual image (301b). The display control unit (4) adjusts, when the projection distance is equal to or longer than the predetermined distance, the brightness of the first virtual image (301a) to a second brightness value and also adjusts duration of projection of the second virtual image (301b) to a second duration without changing the brightness of the second virtual image (301b). The first brightness value is adjusted to be smaller than the second brightness value. The first duration is adjusted to be shorter than the second duration.

This aspect makes the change in the projection distance of the first virtual image (301a) much less noticeable. In addition, this aspect also makes the change in the projection distance of the second virtual image (301b) much less sensible while making the second virtual image (301b) displayed viewable much more easily.

A moving vehicle (100) according to a thirteenth aspect includes the video display system (10) according to any one of the first to twelfth aspects, and a moving vehicle body (101) in which the video display system (10) is installed.

This aspect provides a moving vehicle (100) that makes the change in the projection distance of the virtual image (301) much less noticeable.

A video display method according to a fourteenth aspect includes changing, in a change pattern varying according to situation information, a projection distance from a user's (200) viewpoint to a virtual image (301) projected onto a target space (400) with outgoing light of a display unit (2).

This aspect makes the change in the projection distance of the virtual image (301) much less noticeable.

A non-transitory storage medium according to a fifteenth aspect stores a program designed to make a computer system execute the video display method according to the fourteenth aspect.

This aspect makes the change in the projection distance of the virtual image (301) much less noticeable.

Note that these aspects are only exemplary aspects of the present disclosure. Optionally, various configurations of the video display system (10) according to the exemplary embodiment and its variations described above are also implementable as, for example, a video display method, a (computer) program, or a non-transitory storage medium that stores the program thereon.

Note that the constituent elements according to the second to twelfth aspects are not essential elements of the video display system (10) but may be omitted as appropriate.

While various embodiments have been described herein above, it is to be appreciated that various changes in form and detail may be made without departing from the spirit and scope of the present disclosure presently or hereafter claimed.

The entire contents of Japanese Patent Application No. 2018-117662 mentioned above are incorporated by reference for all purposes.

The invention claimed is:

1. A video display system comprising:
a display configured to display an image thereon;
a projector configured to project a virtual image corresponding to the image onto a target space with outgoing light of the display; and
a display controller configured to vary, within a predetermined range, a projection distance extending from a viewpoint of a user viewing the virtual image, to the virtual image projected onto the target space,
the display controller being configured to:
change a rate at which the projection distance varies within the predetermined range, according to velocity information
vary the projection distance in accordance with a distance instruction, and
set an upper limit value to a magnitude of the change rate for varying the projection distance, wherein the magnitude of the change rate for shortening the projection distance is different from the magnitude of the change rate for extending the projection distance.

2. The video display system of claim 1, wherein
the display controller is configured to be able to change an angle of depression from which the virtual image is viewed from the user's viewpoint.

3. The video display system of claim 1, wherein
the display controller is configured to change, based on at least one of the projection distance or the angle of depression from which the virtual image is viewed from the user's viewpoint, a display mode for the display to display the image.

4. The video display system of claim 2, wherein
the display controller is configured to change, based on at least one of the projection distance or the angle of depression from which the virtual image is viewed from the user's viewpoint, a display mode for the display to display the image.

5. The video display system of claim 2, wherein
the display controller is configured to vary the projection distance in accordance with a distance instruction, and
the display controller is configured to set an upper limit value to magnitude of the change rate for varying the projection distance.

6. The video display system of claim 3, wherein
the display controller is configured to vary the projection distance in accordance with a distance instruction, and the display controller is configured to set an upper limit value to magnitude of the change rate for-varying the projection distance.

7. The video display system of claim 5, wherein
the magnitude of the change rate for shortening the projection distance is different from the magnitude of the change rate for extending the projection distance.

8. The video display system of claim 6, wherein
the magnitude of the change rate for shortening the projection distance is different from the magnitude of the change rate for extending the projection distance.

9. The video display system of claim 1, wherein
as the projection distance is shortened, the change rate for changing the projection distance decreases.

10. The video display system of claim 1, wherein
the situation information includes brightness information about brightness of a surrounding environment, and
the display controller is configured to regulate, in accordance with the brightness information, the change rate for varying the projection distance.

11. The video display system of claim 1, wherein
the situation information includes input information associated with the projection distance, and
the display controller is configured to vary the projection distance stepwise as a value of the input information varies.

12. The video display system of claim 1, wherein
the display, the projector, and the display controller are all mounted in a moving vehicle,
the situation information includes moving vehicle information about the moving vehicle, and
the display controller is configured to vary the projection distance in accordance with the moving vehicle information.

13. The video display system of claim 1, wherein
the display, the projector, and the display controller are all mounted in a moving vehicle,
the situation information includes control information about a state of control, other than velocity, of the moving vehicle, and
the display controller is configured to regulate, in accordance with the control information, the change rate for varying the projection distance.

14. The video display system of claim 1, wherein
the display, the projector, and the display controller are all mounted in a moving vehicle, and
the display controller is configured to vary, in a situation where the moving vehicle's velocity is lower than a reference velocity, the projection distance depending on the angle of depression of the virtual image as viewed from the user's viewpoint,
the display controller extending, in the situation, the projection distance from a first distance when the angle of depression is larger than a predetermined angle into a second distance when the angle of depression is equal to or smaller than the predetermined angle.

15. The video display system of claim 1, wherein
the display, the projector, and the display controller are all mounted in a moving vehicle, and
the virtual image includes a first virtual image and a second virtual image that is displayed only when a particular event occurs, and
the display controller is configured to, when the projection distance is shorter than a predetermined distance, adjust the brightness of the first virtual image to a first brightness value and also adjust duration of projection of the second virtual image to a first duration without changing the brightness of the second virtual image, and
the display controller is configured to, when the projection distance is equal to or longer than the predetermined distance, adjust the brightness of the first virtual image to a second brightness value and also adjust duration of projection of the second virtual image to a second duration without changing the brightness of the second virtual image,
the first brightness value being adjusted to be smaller than the second brightness value,
the first duration being adjusted to be shorter than the second duration.

16. A moving vehicle comprising:
the video display system of claim 1; and
a moving vehicle body in which the video display system is installed.

17. A video display method comprising;
varying, within a predetermined range, a projection distance extending from a user's viewpoint to a virtual image projected onto a target space with outgoing light of a display, in accordance with a change rate at which the projection distance varies within the predetermined range, according to velocity information;
changing a rate at which the projection distance varies within the predetermined range, according to velocity information;
varying the projection distance in accordance with a distance instruction; and
setting an upper limit value to a magnitude of the change rate for varying the projection distance, wherein the magnitude of the change rate for shortening the projection distance is different from the magnitude of the change rate for extending the projection distance.

18. A non-transitory storage medium storing a program that is designed to make a computer system execute the video display method of claim 17.

* * * * *